Oct. 15, 1946.   E. K. CLARK   2,409,420
HEATING APPLIANCE
Filed March 26, 1942   2 Sheets-Sheet 1
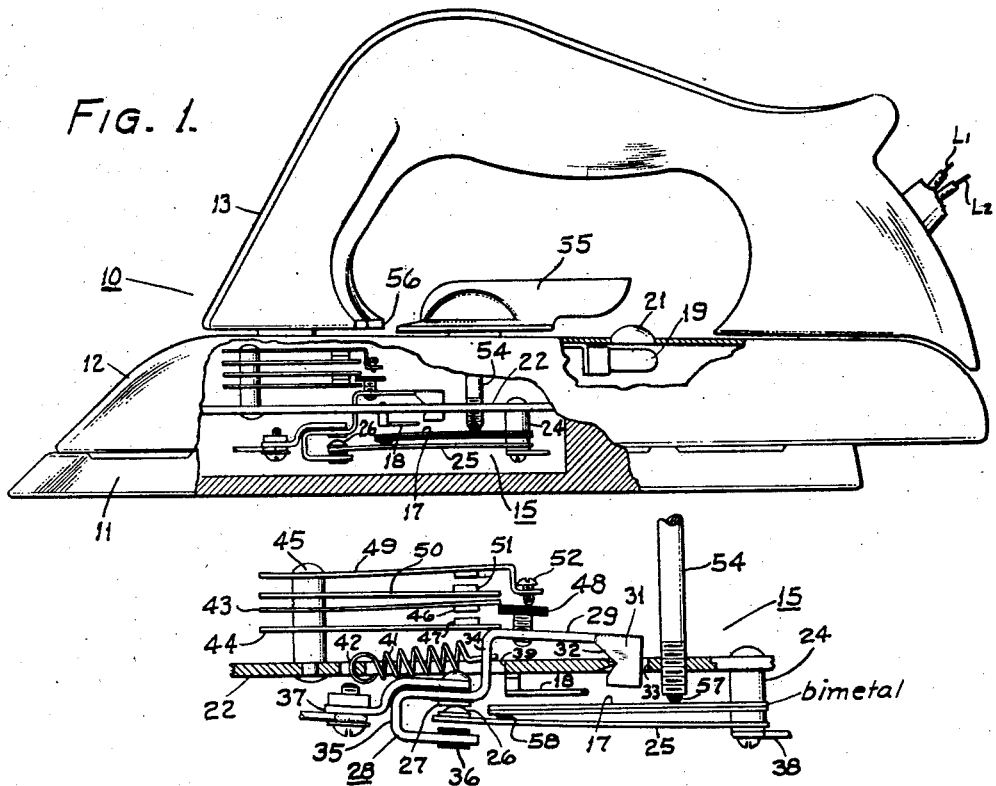
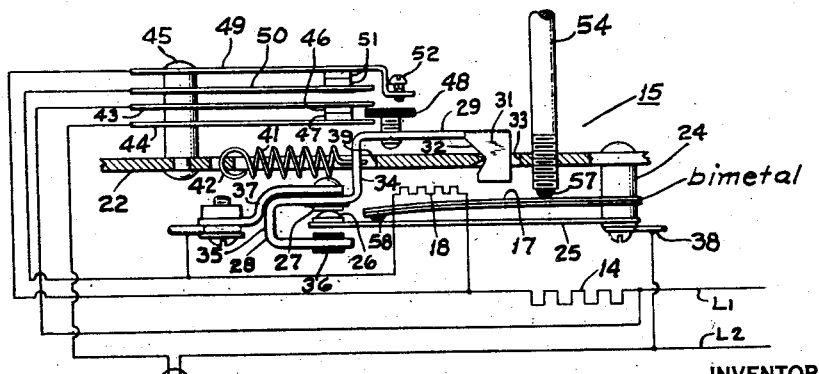
WITNESSES:
INVENTOR
EARL K. CLARK
BY
ATTORNEY Oct. 15, 1946.  E. K. CLARK  2,409,420
HEATING APPLIANCE
Filed March 26, 1942  2 Sheets-Sheet 2

WITNESSES:
Roy H. Envall.
E. H. Lutz.

INVENTOR
EARL K. CLARK

BY
W. R. Coley
ATTORNEY

Patented Oct. 15, 1946

2,409,420

UNITED STATES PATENT OFFICE 2,409,420

HEATING APPLIANCE

Earl K. Clark, Mansfield, Ohio, assignor to Westinghouse Electric Corporation, East Pittsburgh, Pa., a corporation of Pennsylvania Application March 26, 1942, Serial No. 436,299

8 Claims. (Cl. 219—25)

This invention relates to an electrically-heated appliance and more particularly to a thermostat for controlling the heating element thereof to maintain the appliance within a desired temperature range, and it has for an object to provide an improved device of the character set forth.

This invention is particularly suitable with and has been shown and described as applied to an electrically-heated flat iron, but it may be used with other appliances if need therefor be found.

A flat iron usually comprises a soleplate whose lower surface forms the ironing surface, a heating element for heating the soleplate, a thermostat disposed on the upper side of the soleplate and controlling the energization of the heating element in response to the temperature of the soleplate, a cover arranged over the soleplate and the thermostat, and a handle. The thermostat is intended to be responsive to the temperature of the soleplate and is, therefore, arranged in as good heat-receiving relation to the soleplate as possible. However, on initially heating the iron from a low to a new higher temperature the thermostat is incapable of following the rapid temperature rise of the soleplate and consequently lags behind the temperature of the soleplate. The result is that the thermostat switch contacts remain closed for a period of time after the soleplate has reached the desired temperature, and consequently the temperature of the soleplate "overshoots" or goes above the selected temperature range in which it is desired to maintain the soleplate.

In accordance with my invention, I provide means to compensate for the inability of the thermostat to follow a rapid rise in the temperature of the soleplate occasioned by its temperature lagging behind that of the soleplate during the initial heating of the iron from room temperature or heating of the iron from a low ironing temperature to a new higher ironing temperature. In the particular embodiment of my invention herein described, an auxiliary heating element arranged adjacent the temperature-responsive portion of the thermostat is energized when the temperature of the thermostat is abnormally low, that is, when it is substantially below the lower limit of the normal temperature range of the thermostat for the particular setting thereof.

Upon initially heating the iron from a previous low temperature, such as room temperature, to a predetermined ironing temperature range, the auxiliary heating element is energized and gives off heat to the temperature-responsive element of the thermostat. As the selected temperature range of the soleplate is approached and preferably before it is reached, the thermostat automatically cuts off the auxiliary heating element. However, the heat generated by the auxiliary heating element has been stored and is effective to cause the thermostat to open its contacts at substantially the proper temperature. By the end of initial heating-up period or cycle the iron has become saturated so that further heat from the auxiliary heating element is not required. During normal ironing operation, the auxiliary heating element is continuously out of circuit inasmuch as the thermostat opens the circuit to the auxiliary heating element at a temperature below the lower limit of its normal range of temperature variation.

In my copending application, Serial No. 426,209, filed January 9, 1942, and assigned to the assignee of the present invention, there is disclosed an electrically-heated, thermostatically-controlled flatiron having a signal for indicating to the operator or user when the soleplate of the iron is within its set temperature range. This signal, which may, for example, comprise an incandescent lamp, is intended to be continuously energized as long as the soleplate is within its set temperature range. However, as pointed out above, conventional thermostats may lag in their response to the soleplate temperature during the initial heating-up period and allow the temperature of the soleplate to overshoot the set temperature range with the result that the signal will be energized when the soleplate reaches the set temperature range and then be deenergized during the time the soleplate overshoots or is above the set temperature range. Of course, when the soleplate again reaches the set temperature range, the signal is again energized and normally will remain so. This action of the signal is not only confusing to the operator but also calls attention to the inherent inability of a conventional thermostat to prevent overshooting after the initial heating-up period of an appliance. With the present invention, wherein overshooting of the set temperature range of the appliance is substantially prevented, the signal remains energized once the appliance reaches the set temperature range.

It is an object of this invention to provide an improved electrically heated appliance which does not "overshoot" its set temperature range in initially heating up or when adjusted from a low to a new higher temperature range.

These and other objects are effected by my invention as will be apparent from the following description and claims taken in connection with the accompanying drawings, forming a part of this application, in which:

Fig. 1 is a side elevation, partly broken away, of an electrically-heated flat iron in which the present invention is incorporated;

Fig. 2 is a side elevation of the thermostat employed in the flat iron shown in Fig. 1, and showing the relation of the parts when the iron and the thermostat are coming up to temperature;

Fig. 3 is a view similar to Fig. 2, showing the parts in the relation they assume when the temperature-responsive element of the thermostat has almost reached its switch-opening temperature, and including a wiring diagram of the electrical circuits employed in the iron illustrated in Fig. 1;

Figure 4:
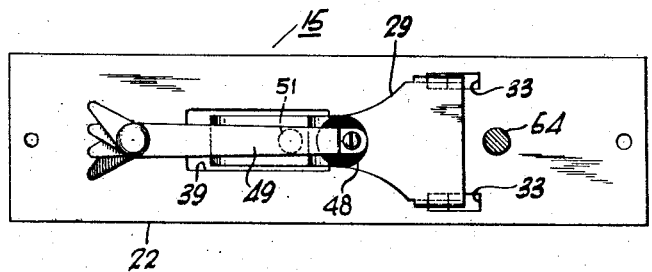
Fig. 4 is a plan view of the thermostat illustrated in Figs. 2 and 3.
Figure 5:
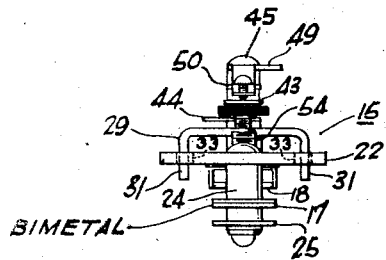
Fig. 5 is an end view looking from the right of Fig. 3.
Figure 6:
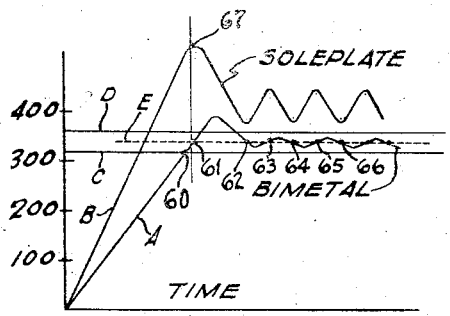
Figure 7:
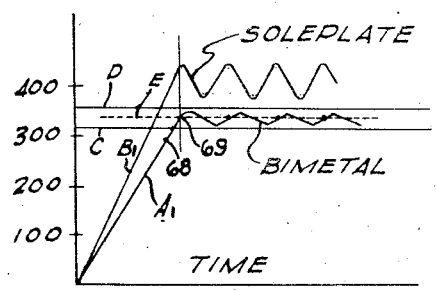

Fig. 6 is a graph representing the temperature condition of the temperature-responsive element of the thermostat and of the soleplate of an iron in which the auxiliary heater for the temperature-responsive element of the present invention is not provided; and Fig. 7 is a graph similar to that shown in Fig. 6, but showing the temperature condition of the soleplate and the temperature-responsive element with the auxiliary heater of the present invention incorporated in the thermostat structure.

The present invention is incorporated in a thermostat similar to that shown in my mentioned copending application although it is to be understood that the invention is not limited to this particular application.

Referring to the drawings, there is illustrated an electrically-heated flatiron generally indicated 10, which comprises an electrically-heated soleplate 11, a cover 12, and a handle 13. The soleplate may be heated in any conventional manner, as by a resistance element clamped thereto or preferably by means of an armored resistance element cast or embedded therein. The resistance element for heating the soleplate is schematically indicated at 14 in Fig. 3.

The resistance element 14, controlled by means of an adjustable thermostat, generally indicated 15, supplies heat to the soleplate to maintain the same within a desired or set temperature range determined by the setting of the thermostat. The thermostat 15 is preferably supported within a recess in the soleplate 11, as shown in Fig. 1, with its heat-responsive bimetal element 17 mounted closely adjacent the soleplate so that the bimetal element is responsive to the temperature of the soleplate. The temperature 15 controls a circuit for the soleplate heating element 14 and an auxiliary heating element 18 and also controls a second circuit in such a manner than an incandescent lamp 19 or other electrically-operated visual or audible signal in the second circuit will indicate to the operator of the iron when the iron is within its set temperature range and therefore ready for use. The lamp or signal 19 may be mounted in any desired position on the iron, as for example, within the cover 12 below a window 21 (Fig. 1).

Referring particularly to Figs. 2 to 5, inclusive, where the thermostat 15 is shown apart from the iron, it will be noted that the thermostat structure is mounted on a supporting plate or base 22 which may be secured to bosses or the like formed on or carried by the upper surface of the soleplate 11. The plate 22 is provided with a depending post 24, adjacent its rear end, to which the bimetal strip 17 is secured. This post also carries a spring, contact-carrying, arm 25 which is normally self-biased or sprung upwardly as shown in Fig. 2. The bimetal strip 17 and the arm 25 are preferably insulatedly mounted on the post 24 with the bimetal strip arranged to bow downwardly toward the arm when heated.

A contact 26 carried on the free end of the spring arm 25 is adapted to engage a cooperating contact 27 carried by a pivoted contact frame 28. These contacts, when closed, complete an energizing circuit (Fig. 3) for the heating element 14.

The contact frame 28 comprises an irregularly-shaped rigid member which includes a horizontal portion 29 disposed above the base 22 and provided with depending flanges 31 (Fig. 5) having aligned V-shaped notches 32 therein. These flanges 31 are receivable in spaced apertures 33 (Fig. 4) formed in the plate 22. The edges of the plate 22, at these apertures, which face the notches 32 in the flanges 31 are preferably bevelled to provide fulcrum or pivot points receivable in the notches 32 so that the contact frame 28 is free to rock on the plate 22.

A vertical portion 34 of the frame 28, extending downwardly from the forward or left end of the horizontal portion 29, terminates in a U-shaped portion 35 which insulatedly carries the mentioned contact 27 in the upper arm thereof. The lower arm of this U-shaped portion carries an adjustable insulating button or stop 36. The spacing between the top of this button 36 and the contact 27 is preferably such as to provide a clearance for the movable contact 26 carried by the arm 25 of the order of between .005 and .010 inch. The contact 27 may be provided with a terminal arm 37, insulated from the frame 28, while a terminal 38 may be connected to the fixed end of the spring arm 25, for connecting the contacts 26 and 27 in the circuit for the heating element 14 (Fig. 3).

The vertical portion 34 of the contact frame 28 extends through an opening 39 formed in the base 22 and has connected thereto one end of a tension spring 41, the other end of this spring being anchored to the base as indicated at 42. The spring 41 normally maintains the contact frame 28 in the position shown in Figs. 1 and 3.

A pair of spring, contact-carrying, arms 43 and 44 are insulatedly fixed to the base 22 as by means of a supporting post 45. Contacts 46 and 47 carried by the arms 43 and 44, respectively, control a circuit (Fig. 3) for the signal lamp 19. A screw 48, adjustably threaded into the horizontal portion 29 of the contact frame 28, is positioned with the head thereof, which is preferably made of non-conducting material, between the projecting free ends of the spring arms 43 and 44 so that when the contact frame 28 is materially above (Fig. 2) or below its normal position (Figs. 1 and 3), the screw head will engage one or the other of the arms 43 and 44 and separate the contacts 46 and 47 to interrupt the lamp circuit. From the construction just described it will be seen that the signal lamp circuit will be closed only when the contact frame is in or near its normal position.

A second pair of spring, contact-carrying, arms 49 and 50 are insulatedly attached to the supporting post 45 and preferably extend parallel to the first pair of arms 43 and 44. Switch contacts 51 carried adjacent the free ends of the arms 49 and 50, when closed, provide a shunt circuit (Fig. 3) across the auxiliary heating element 18. By reference to Fig. 3, it will be noted that the auxiliary heating element 18 and switch 51 are connected in parallel and in series with the soleplate heating element 14. Thus with the switch 51 closed, the auxiliary heating element is shunted and the soleplate heating element is connected across the line L1 and L2, providing the contacts 26 and 27 are also closed. However, when the switch 51 is open, thereby interrupting the shunt circuit across the auxiliary heating element 18, this heating element is then connected in series with the soleplate heating element 14.

When the contact frame 28 is materially above (Fig. 2) its normal position which is shown in Figs. 1 and 3, the head of the screw 48 engages the lower end of an adjusting screw 52 carried by a projecting end of the upper spring arm 49, raising this arm and separating the contacts 51 to open the shunt circuit across the auxiliary heating element 18. This condition of the switch 51 is illustrated in Fig. 2. However, when the contact frame is in or near its normal position, the switch 51 is closed, as shown in Figs. 1 and 3.

By reference to Fig. 3, it will be noted that the gap between the lower end of the adjusting screw 52 and the top of the head of the screw 48 is preferably greater than the gap between the top of this screw head and the projecting end of the spring arm 43 so that as the contact frame moves downwardly from the position shown in Fig. 2, as the temperature of the bimetal increases, the contacts 51 will close slightly before the closing of contacts 46 and 47. The adjusting screw 52 provides a convenient means for regulating or determining the position at which the contact frame 28 will close the switch 51.

The thermostat 15 is adjusted by means of a rod 54 which is threaded through the base 22 in alignment with the bimetal strip 17. The upper end of this rod has fixed thereto an operating knob 55 (Fig. 1) which may be provided with a suitable scale adapted to be read in conjunction with an index such as 56 and which may comprise a projection formed on the front support of the handle 13. This scale may be graduated in any desired manner to indicate the temperature of the soleplate either in degrees or types of material adapted to be ironed when the iron is within its set temperature range. The lower end of this rod carries a button 57, of insulating material, which engages the bimetal strip 17 adjacent its fixed end. Turning of the knob 55 in one direction or the other flexes the bimetal strip so that its free end is moved toward or away from the spring arm 25 to vary the switch-opening temperature of the bimetal 17.

It will be understood that the rod 54 may be turned down sufficiently to maintain the contacts 26 and 27 open and thereby provide an "off" position for the iron without the need of a separate line switch. In the "off" position of the thermostat, the free end of the spring arm 25 engages the button 36 and holds the contact frame 28 below its normal position (Figs. 1 and 3), so that the head of screw 48 depresses the lower spring arm 44 to open contacts 46—47 of the signal circuit.

When the iron is at room temperature and the thermostat adjusting knob 55 is turned from its "off" position to a position to maintain the iron at a particular temperature, the rod 54 is thereby raised, allowing the bimetal strip 17 to move upwardly in a direction away from the spring arm 25. Since the spring arm 25 is self-biased upwardly, under the condition just mentioned, this spring arm will also move upwardly and cause its contact 26 to engage the contact 27 carried by the contact frame 28 and raise the contact frame to substantially the position shown in Fig. 2. With the contact frame in this position, the head of the adjusting screw 48 has raised the upper spring arm 43 and separated contacts 46 and 47 to interrupt the circuit for the indicating lamp 19 and has also raised the spring arm 49 to open the shunt circuit of the auxiliary heating element, while the contacts 26 and 27 are closed and complete the circuit for energizing the heating element 14 and the auxiliary heating element 18.

As the temperature of the soleplate increases, the temperature of the bimetal strip 17 also increases and it begins to bow downwardly and eventually its free end, which may be provided with a spherical knob 58 of insulating material, will engage the spring arm 25. Continued bowing of the bimetal strip forces the spring arm downwardly until it reaches the position shown in Fig. 3. The spring 41 causes the contact frame 28 to follow the spring 25 to maintain contacts 26 and 27 closed until this frame reaches its normal position (Fig. 3). When in this position, the contacts 46 and 47, which control the lamp circuit, and the contacts 51, which control the shunt across the auxiliary heating element 18, have closed. Further movement of the bimetal strip causes the contact 26 to move clear of the contact 27, as shown in Fig. 1, and open the circuit for the heating element 14. From the above description, it will be seen that the signal lamp 19 is energized and the auxiliary heating element is deenergized prior to the interruption of the circuit for the heating element 14, and that this last-mentioned circuit is interrupted when the thermostat reaches its set temperature.

After the heater circuit has been interrupted by opening of contacts 26 and 27, the soleplate and the bimetal strip begin to cool, allowing the bimetal strip to move upwardly so that these contacts again close to energize the heating element 14 to maintain the soleplate within its set temperature range. It will be appreciated that when the soleplate is within its set temperature range the thermostat cycles between "off" and "on" to open and close contacts 26 and 27 and intermittently energize the heater 14 to maintain the temperature of soleplate within that range.

The movement of the bimetal strip 17 during this cycling operation of the thermostat is, of course, sufficient to open and close contacts 26 and 27 but the clearance between the head of screw 48 and the projecting ends of the spring arms 43 and 44 and the lower end of the adjusting screw 52 is preferably such as to allow the contacts 46—47 and 51 to remain closed during such cycling of the thermostat so that the lamp 19 remains lit and the auxiliary heating element is deenergized as long as the soleplate is within the set temperature range.

To change the set temperature of the iron from a previously high temperature to a lower temperature, as for example, when it is desired to iron with the soleplate at 250° F. and the iron is already at 350° F., the adjusting rod 54 is turned down causing the free end of the bimetal strip 17, which is already adjacent to the spring arm 25, to be flexed downwardly and move this arm so that its free end engages the insulating button 36 of the contact frame 28 and thereby swing the contact frame below its normal position (Fig. 3). This movement of the contact frame 28 causes the head of the screw 48 to engage the free end of the lower spring arm 44 to pull it downwardly and open the contacts 46 and 47 and extinguish the lamp 19, but the contacts 51 remain closed and the auxiliary heating element 18 is not energized. With the lamp out, the operator knows that the iron is no longer at the temperature indicated by the scale on the thermostat adjusting knob 55. The mentioned movement of the spring arm 25 also opens the contacts 26 and 27 so that the circuit for the heating element 14 is interrupted and they will remain open until the soleplate and the bimetal strip heated thereby have cooled sufficiently to allow the parts to move to the position shown in Fig. 3. As in the case where the iron is being brought up to heat, on allowing the iron to cool from a previous high temperature to a new low temperature, the contacts 46 and 47 will close shortly prior to the time when the contact frame reaches its normal position.

The operation of the thermostat and the function of the auxiliary heating element 18 will be better understood by reference to the graphs of Figs. 6 and 7 wherein the temperature of the bimetal element 17 and soleplate 11 have been plotted against time. The graph of Fig. 6 represents the time-temperature condition of an iron which is not provided with an auxiliary heating element 18, while the graph of Fig. 7 shows the time-temperature condition of an iron employing the auxiliary bimetal heating element 18 of the present invention. It will be understood that the shapes of the temperature curves will vary depending on the various characteristics of the iron, particularly the thermostat and its thermal relation to the soleplate and also depending on the conditions of use.

In these graphs, time is plotted on the abscissa, and temperature, of the bimetal and soleplate, on the ordinate. The curves A, $A_1$ and B, $B_1$; represent, respectively, the temperature of the bimetal element and the soleplate. The horizontal lines C and D represent, respectively, the lower and upper limits of the light switch 46—47. As long as the temperature of the bimetal element lies between these lines, with the thermostat set to maintain the soleplate within the range represented by the sinuous or regular part of the curves B or $B_1$, the light switch will remain closed. The actual set temperature of the thermostat, under the conditions assumed in plotting these graphs, is approximately 340° F. as indicated by the line E, this line representing the temperature at which the bimetal element opens and closes the switch 26—27 to control the energization of the iron heating element 14 to maintain the soleplate at approximately 400° F.

In plotting each of these graphs, it is assumed that the iron has been at room temperature and then turned on to operate with a soleplate temperature of approximately 400° F. It is, of course, not possible to maintain the soleplate at one particular temperature; in practice the set temperatures of the soleplate and of the bimetal 17 actually are temperature ranges or zones lying between upper and lower temperature limits represented respectively by the tops of the peaks and the bottoms of the valleys of the sinuous or regular parts of the two temperature curves of these graphs.

Referring first to the graph of Fig. 6, representing the temperature condition of an iron having no auxiliary heater 18, it will be noted that as the soleplate heats up (curve B), the temperature of the bimetal (curve A) increases until the parts of the thermostat reach the position shown in Fig. 3 where the light-controlling switch 46—47 has closed to light lamp 19, the closing of this switch being represented by the point 60 in Fig. 6. However, the switch 26—27 does not open to deenergize the heating element 14 until the point 61 (Fig. 6) is reached, the condition of the thermostat just after this switch has opened being shown in Fig. 1.

The soleplate and bimetal then cool until the point 62 (Fig. 6) is reached, at which time the switch 26—27 again closes, but since the temperature of the thermostat does not drop below the line C, the light switch does not open. The thermostat continues to cycle to open switch 26—27 at points 63 and 65 and close it at points 64 and 66, the light 19 remaining lit for the particular setting of the thermostat as long as the temperature of the thermostat remains between the lines C and D.

In view of the fact that during the initial heating-up period of the iron, the temperature of the bimetal lags behind that of the soleplate, by the time the bimetal reaches its switch-opening temperature, as indicated by the point 61 on the graph of Fig. 6, the temperature of the soleplate has gone above the desired set temperature range, as indicated by the high peak 67 of the curve B. Under this condition, the temperature of the bimetal element continues to rise, by virtue of the excess heat in the soleplate, and goes above the upper line D of the graph of Fig. 6, and thus extinguishes the signal light. As the bimetal element cools down, the signal will again be energized when the temperature of the bimetal falls below the line D. During the following cycles of the thermostatic switch, the temperature of the bimetal element and of the soleplate follow substantially sinuous paths, as shown in the graph in Fig. 6, to maintain the iron at a substantially uniform temperature, and the temperature of the bimetal element will lie between lines C and D and thereby permit the signal switch to remain closed and energize the signal.

It will be seen from the above discussion and by reference to Fig. 6 that during the initial heating up period of the iron, the soleplate temperature may overshoot the set temperature range and the signal may be deenergized for a brief interval after the iron has once reached its set temperature range. The present invention overcomes these disadvantages by providing the auxiliary heater 18 which supplies heat to the bimetal element during the initial heating up period so that the bimetal element is heated in substantially parallel relation to the soleplate heating element 14.

The graph of Fig. 7 is substantially identical with the graph of Fig. 6 and, as mentioned, represents the time-temperature conditions of the bimetal element 17 and the soleplate 11 when the auxiliary heater is applied to the thermostat. In Fig. 7, the point 68 represents approximately the temperature of the bimetal at the time the switch contacts 51 close to shunt out the auxiliary heating element 18. The added heat supplied to the bimetal element 17 by the auxiliary heating element 18 during the heating period of the bimetal element is sufficient to raise the bimetal to switch-opening temperature, as indicated by the point 69 on the curve $A_1$, by the time the soleplate reaches its set temperature range, thus avoiding the high peak of the soleplate temperature curve shown in Fig. 6 which occurs if an auxiliary source of heat for the bimetal element of the thermostat is not provided during the initial heating up period of the iron.

When the switch contacts 51 once close, they will remain closed as long as the temperature of the bimetal element 17 does not drop below the temperature value represented by the point 68 of the graph of Fig. 7.

The bimetal element shown in the illustrated embodiment of the invention is of the creep type, in which the switch contacts 26 and 27 normally open and close at substantially the same temperature. Accordingly, the points 61 to 67 of the graph in Fig. 6 and the corresponding points of the graph of Fig. 7 lie on the same horizontal line. The invention is also applicable to a thermostat employing a bimetal element of the snap-acting type, in which the contacts close at a temperature lower than that at which they open. In such case, the points 61, 63, and 65 would lie on one horizontal line and the points 62, 64, and 66 would lie on a second and lower horizontal line. Both lines, however, would be between the tops of the peaks and the bottoms of the valleys of the sinuous part of the graph and within the zone bounded by the lines C and D.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. An electrically-heated appliance comprising a part to be heated, electrical means for heating said part, an element responsive to the temperature of said part for controlling the energization of said heating means to maintain said part within a predetermined temperature range, auxiliary electrical heating means localized adjacent said element for supplying heat thereto, a switch actuated by said element for controlling the energization of said auxiliary heating means, said switch being in one switching position to deenergize said auxiliary heating means when the element responds to a temperature within said range and in another switching position to energize said auxiliary heating means when the element responds to a temperature below said range.

2. An electrically-heated appliance comprising a part to be heated, electrical means for heating said part, a thermostat for controlling the operation of said heating means, said thermostat including a temperature-responsive element responsive to the temperature of said part and a switch controlled by said temperature-responsive element for controlling the energization of said heating means, an auxiliary electrical heating means localized adjacent said temperature-responsive element, and a second switch actuated by said temperature-responsive element to control the energization of said auxiliary heating means, said element actuating said second switch to deenergize said auxiliary heating means throughout the range of movement through which it normally moves for a given setting of the thermostat and actuating said second switch to energize said auxiliary heating means when the thermostat moves substantially outside of said range of movement in the direction of decreasing temperature.

3. A flat iron comprising a soleplate having an ironing surface on the lower side thereof, an electric heating element for heating said soleplate, a thermostat disposed on the upper side of said soleplate in heat-receiving relation thereto and controlling the energization of said heating element to maintain the soleplate within a predetermined temperature range, a cover arranged over said soleplate and said thermostat, an auxiliary heating element arranged adjacent said thermostat so that said thermostat is subjected to the heat thereof when it is energized, said thermostat being adapted to cause energization of said auxiliary heating element only when the temperature of said soleplate is substantially below said range.

4. An electrically-heated appliance comprising a part to be heated, electric heating means for heating said part, a thermostat disposed in heat-receiving relation to said part and controlling the energization of said heating means to maintain said part within a predetermined temperature range, and auxiliary electric heating means arranged adjacent said thermostat so that said thermostat is subjected to the heat thereof when it is energized, said thermostat being adapted to cause energization of said auxiliary heating means only when the temperature of said thermostat is substantially below the range through which it varies when said part is within said predetermined temperature range.

5. An electrically-heated appliance comprising a part to be heated, electrical means for heating said part, a switch for controlling the energization of said electrical means, means responsive to the temperature of said part for actuating said switch to maintain said part within a predetermined temperature range, a second switch, and auxiliary electrical means controlled by said second switch for supplying heat to said temperature-responsive means, said temperature-responsive means actuating said second switch to energize said last-mentioned electrical means only when the temperature of said part is substantially below said temperature range.

6. An appliance comprising a part to be heated, means for heating said part, a thermostat for controlling the operation of said heating means in response to the temperature of said part, auxiliary heating means, the heating effect of said auxiliary heating means being applied to the thermostat to hasten the action thereof in deenergizing the first-mentioned heating means, said thermostat controlling said auxiliary heating means to deenergize the same throughout the range of movement through which it normally moves for a given setting of the thermostat and to energize the same when the thermostat moves to a position substantially outside of said range of movement in the direction of decreasing temperature.

7. A thermostat comprising a temperature-responsive element, a first switch opened by said temperature-responsive element in response to increase above a predetermined temperature and closed thereby upon decrease below substantially the same temperature, auxiliary heating means arranged so that the heating effect thereof is imposed on said temperature-responsive element, and a second switch controlling energization of said auxiliary heating means, said temperature-responsive element actuating said second switch to deenergize said auxiliary heating means in response to increase above a second predetermined temperature and to energize said auxiliary heating means in response to decrease below substantially the same temperature, said second predetermined temperature being sufficiently below the first-mentioned predetermined temperature so that said second predetermined temperature is not reached during normal operation of the thermostat.

8. A thermostat as set forth in claim 7 and further comprising means for adjusting the thermostat for higher or lower predetermined temperatures, the relation between the first and second predetermined temperatures remaining substantially the same.

EARL K. CLARK.